March 20, 1928. 1,663,456
F. J. MacDONALD
METHOD AND APPARATUS FOR MAKING FOOTWEAR
Filed Aug. 19, 1922 5 Sheets-Sheet 1

Inventor
Frank J. MacDonald
By Robert M. Pierson
Atty.

March 20, 1928. 1,663,456
F. J. MacDONALD
METHOD AND APPARATUS FOR MAKING FOOTWEAR
Filed Aug. 19, 1922 5 Sheets-Sheet 2
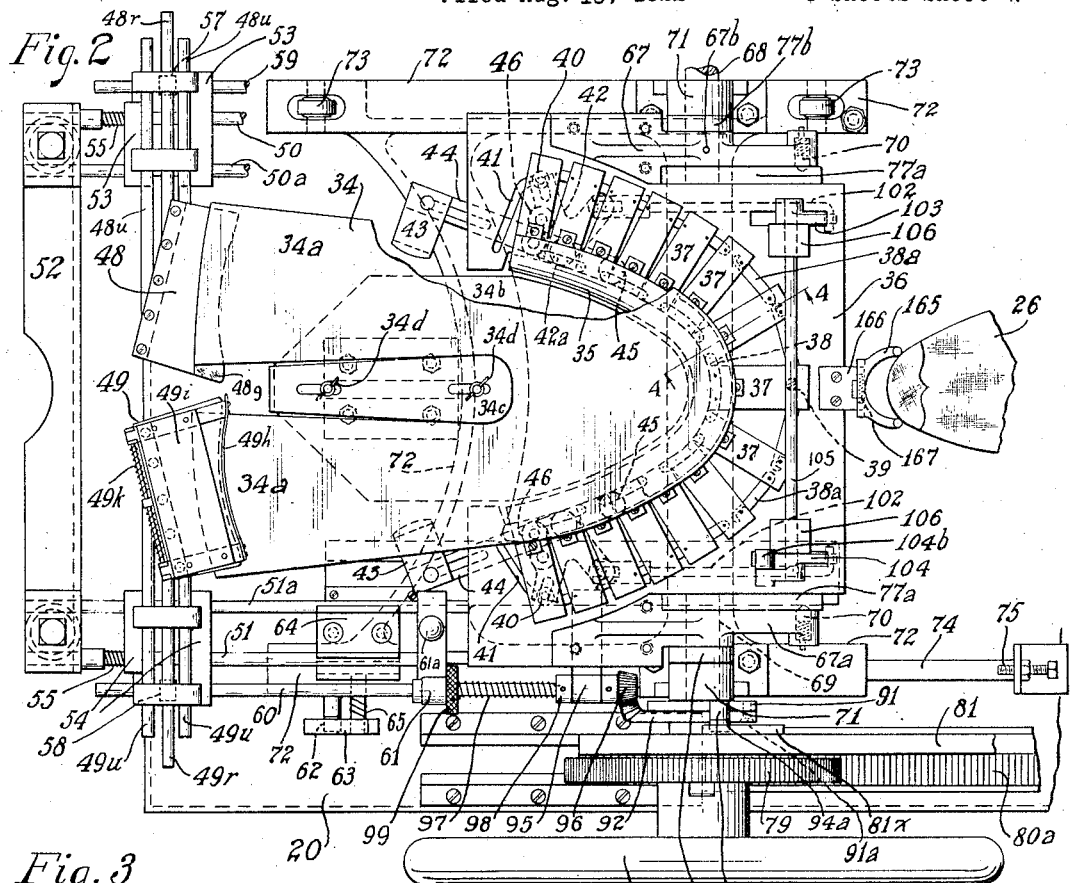
Inventor
Frank J. MacDonald
By Robert M. Pierson
Atty.

March 20, 1928.  1,663,456
F. J. MacDONALD
METHOD AND APPARATUS FOR MAKING FOOTWEAR
Filed Aug. 19, 1922  5 Sheets-Sheet 3
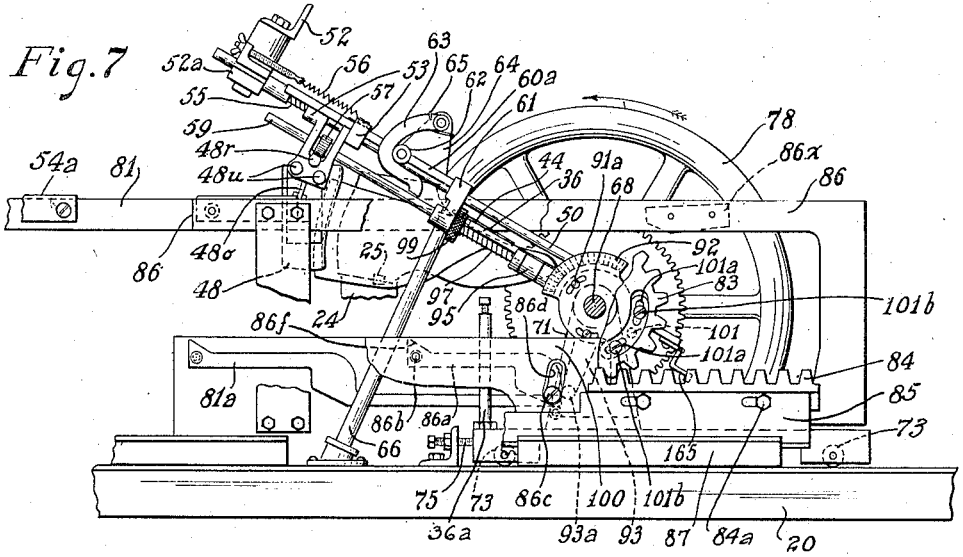
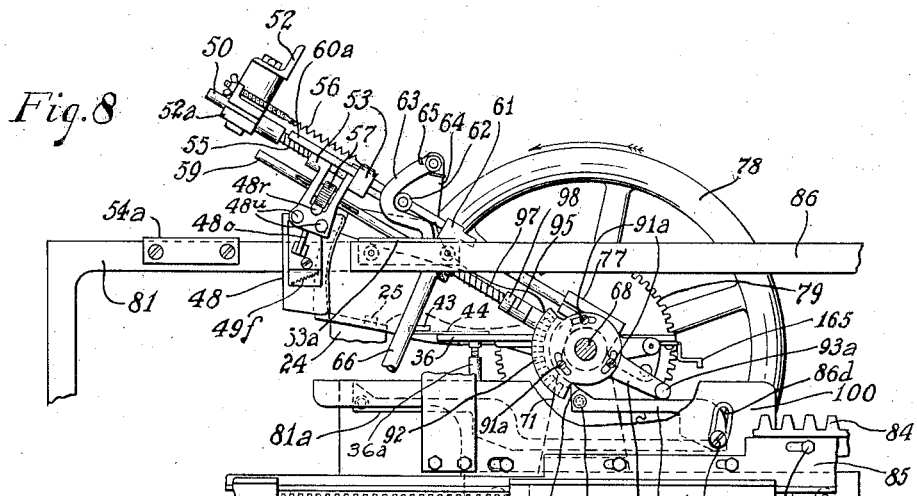
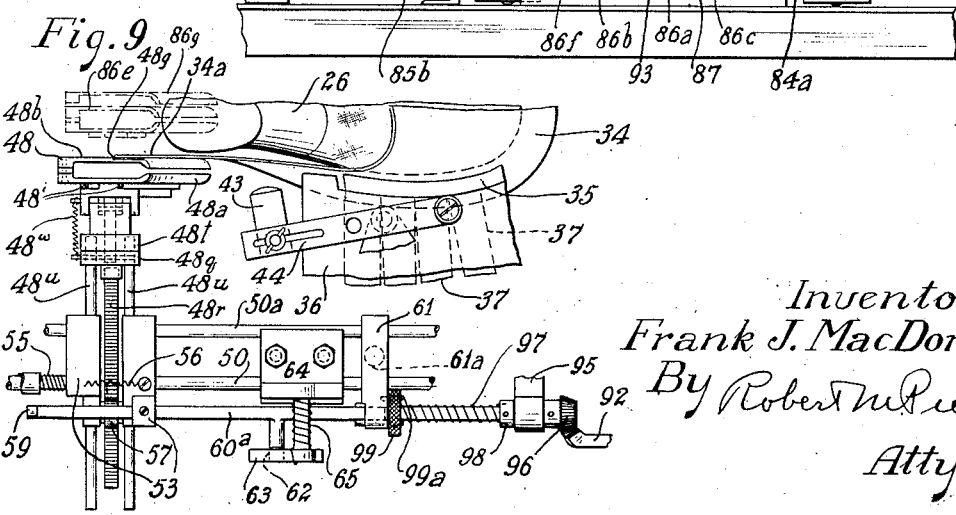
Inventor
Frank J. MacDonald
By Robert M. Pierson
Atty.

March 20, 1928.  F. J. MacDONALD  1,663,456
METHOD AND APPARATUS FOR MAKING FOOTWEAR
Filed Aug. 19, 1922   5 Sheets-Sheet 4

Inventor
Frank J. MacDonald
By Robert M. Pierson
Atty.

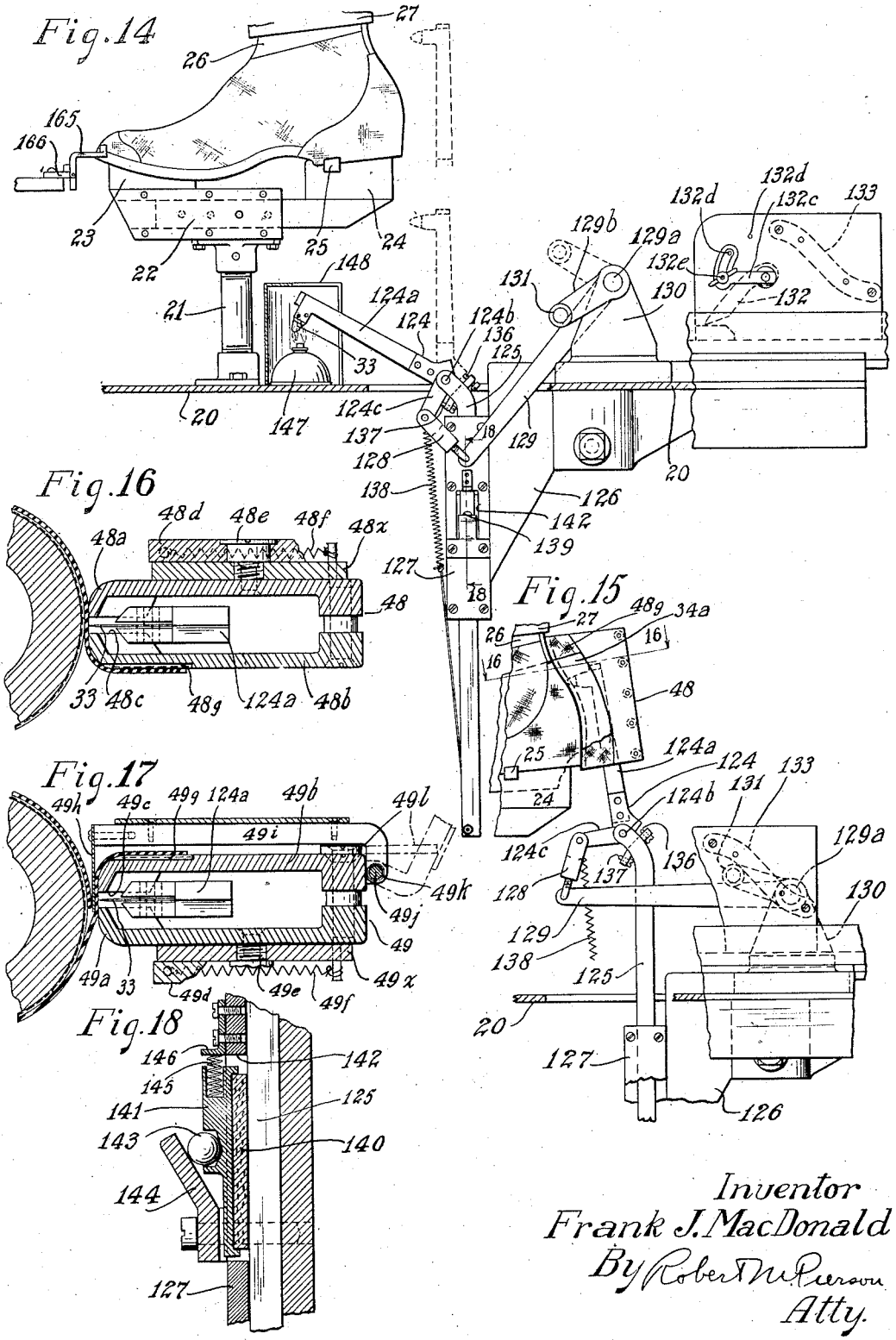

Patented Mar. 20, 1928.

1,663,456

UNITED STATES PATENT OFFICE.

FRANK J. MacDONALD, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING FOOTWEAR.

Application filed August 19, 1922. Serial No. 582,884.

This invention relates to the art of making footwear, and more especially rubber shoes, and its object is to provide an improved method and improved apparatus for applying the upper or vamp to the last or to the lining and other inner parts of a shoe mounted upon a last, which operation, so far as I am aware, has heretofore been performed by hand, as to rubber shoes. While several features of my improved actuating mechanism are applicable to machines using mechanical grippers such as are used in the leather shoe art, important features of my invention relate to the work-engaging instrumentalities for holding and manipulating the highly flexible, elastic and adhesive raw gum upper of a rubber shoe, to apply it to the last with proper tension in its several parts and without requiring it to slide upon the underlying shoe parts, my invention making it possible to dispense with mechanical grippers for engaging the work. My invention affords the advantages of increased speed and uniformity of production, with less fatigue on the part of the operator.

Of the accompanying drawings, Fig. 1 is a side elevation, partly broken away, showing a rubber-shoe-uppering machine constructed according to my invention and adapted to carry out the method involved therein.

Fig. 2 is a plan view of one end of the machine with an upper, partly broken away, laid thereon in position for lasting.

Fig. 3 is a reverse plan view of parts shown in Fig. 2.

Fig. 4 is a section on the line 4—4 of Fig. 2.

Fig. 5 is a perspective view of a link and lever forming a part of the actuating mechanism for a flexible toe-stock-anchoring member or toe stretcher.

Fig. 6 is a front elevation of one of the heel-stock-anchoring members or heel-stretchers, together with the trimmer-plate attached thereto.

Fig. 7 is a side elevation illustrating the positions of the parts as the upper is being applied to the last.

Fig. 8 is a similar view illustrating the positions of said parts when the upper has been stretched about the last.

Fig. 9 is a partial plan view with the parts positioned as in Fig. 7 and illustrating in broken lines further positions of one of the heel-stretchers.

Fig. 14 is a side elevation showing the last and its support, together with the trimming knife, its heater and actuating mechanism.

Fig. 15 is a view of parts shown in Fig. 14, together with one of the heel-stretchers and the knife in trimming position.

Fig. 16 is a horizontal section on the line 16—16 of Fig. 15, showing the stretching of one of the rear ends or wings of the upper around the heel part of the last, together with the knife in position to trim said end.

Fig. 17 is a similar view showing the stretching of the other rear end and the co-operative relation of the trimming-plate and knife.

Fig. 18 is a section on the line 18—18 of Fig. 14, illustrating an automatic one-way friction-brake for the knife slide.

Fig. 19 (Sheet 1), is a side elevation showing the rear end of the uppered last, together with the seam roller and its actuating mechanism.

*General description.*

In the embodiment of my invention here shown, the last comes to the machine with the rubberized cloth lining and other inner parts of the shoe applied thereto, and the last being supported, right side up, upon a pedestal, the machine applies over these lasted parts a flat, vulcanizable, sheet rubber upper or vamp of the usual form, joins its wings or heel portions in a seam at the heel, and presses its toe margin around the edge of the sole.

The instrumentalities for so manipulating the vamp comprise a flexible U-shaped toe-stock-anchoring member or toe-stretcher adapted to receive and adhesively hold the toe-margin of the flat vamp as the latter is laid thereon in an inverted, horizontal position, with its toe portion adjacent the toe of the last, a pair of heel-stock-anchoring members or heel-stretchers adapted concurrently so to receive and hold the heel margins of the wing portions of the vamp, means for so moving the toe-stretcher and heel-stretchers as to turn and move the vamp over onto the last, the vamp turning over its toe-portion, roughly, as a center, means for turning the heel-stretchers from a horizontal to a vertical plane to carry the wings of the vamp into parallel relation with the sides of the last's heel portion, and means for successively moving said heel-stretchers to swing said wing portions around the heel of the last, and apply them thereto, said stretchers contacting only the outer face of the vamp. Instrumentalities are also provided for closing the legs of the flexible U-shaped toe-anchoring member to turn the margin of the vamp under the edges of the sole and press it thereto, and members are provided for concurrently pulling the vamp into the instep curves of the last. A vertically moving, medially positioned knife, and actuating means therefor, are provided for severing the excess stock from the wings of the vamp as they are successively applied to the heel portion of the last, and a seam roller, following the course of the knife, is provided for rolling the vertical seam at the heel of the shoe after the knife has operated upon said wing-portions successively.

*Last support.*

Figure 1:
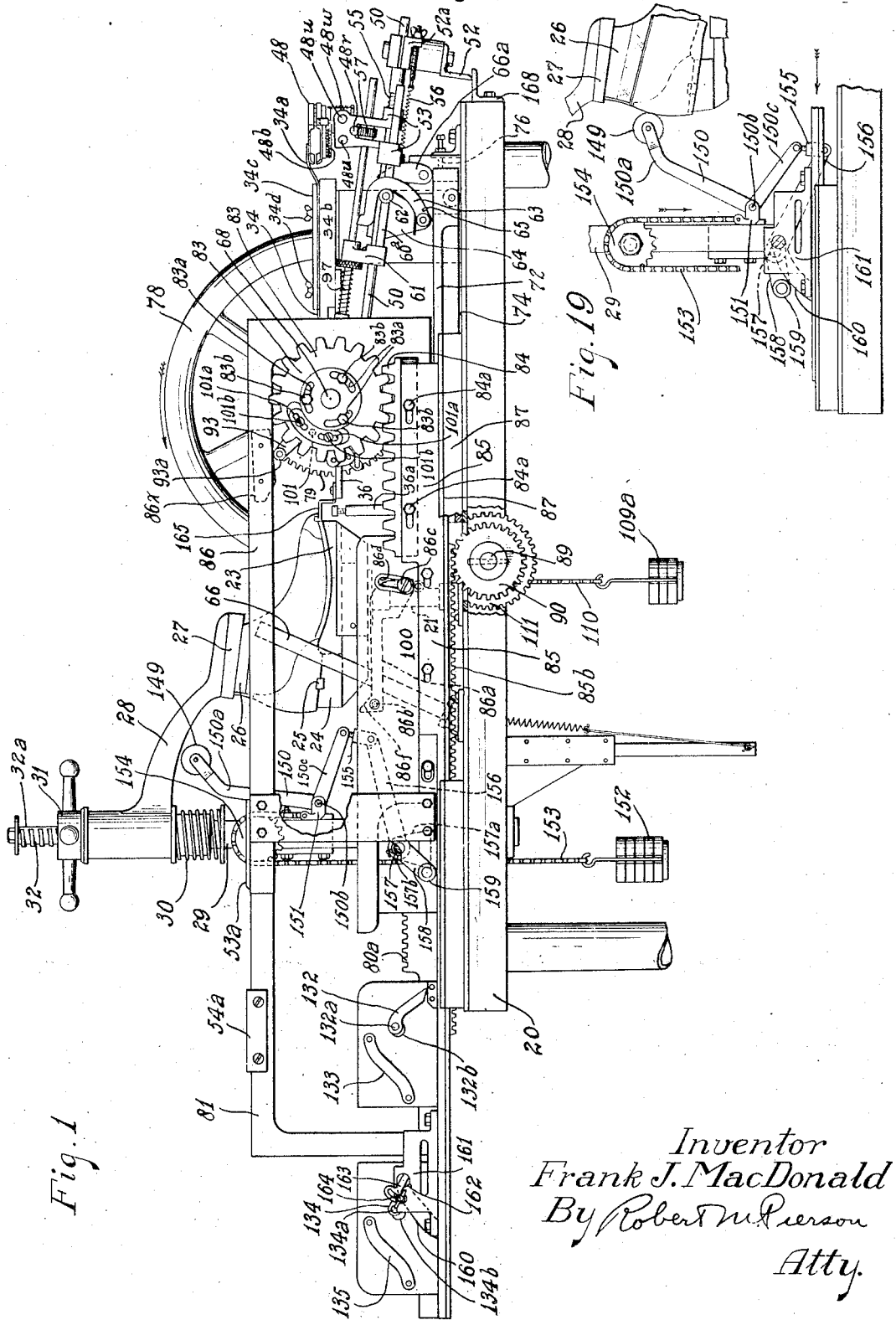

Referring first to Figs. 1 and 14, the machine here illustrated comprises a table 20, on the central part of which is mounted a pedestal 21, having at its top a shoe-last support 22 including a toe-rest block 23 and a heel-rest block 24, the latter being carried on a slide so that it can be adjusted from and toward the toe-rest block to suit the length of different sized lasts, and the heel-rest block is provided with a pair of side gauges, one being shown at 25, for positioning a shoe-last 26 thereon. Said gauges, in any suitable manner, may be made adjustable to accommodate shoe-lasts of different widths.

For holding the last 26 upon the support 22, a soft-rubber pad 27, adapted to bear upon the top of the last, is attached to the overhanging end of a clamping arm 28 mounted to swing horizontally and slide vertically upon a post 29 rising from the table 20, said arm being urged upward on said post by a helical compression spring 30 and adapted to be held down in clamping position, against the action of said spring, by a hand-wheel-nut 31 having segmental threads (not shown) adapted to engage a mutilated screw-thread 32 formed on the reduced upper end portion of said post, said nut being vertically slidable with the arm 28 when turned to a position in which its segmental threads are in registry with a vertical fairway 32ª of the screw-thread 32.

*Toe stretcher.*

The vamp is shown, partly broken away, at 34 in Fig. 2. The flexible U-shaped member for anchoring the toe-margin of the vamp and swinging it over onto the last is designated 35 (Figs. 2, 3 and 4), its cross-sectional form being clearly shown in Fig. 4. It is preferably of soft rubber, which may be coated with rubber cement from time to time to assure that the stock will adhere thereto, and in its opened out condition fits within a bay cut in a tiltable and movable plate 36, being supported therein by a curved series of small rectangular plates 37, 37 secured at their inner ends to the stock-anchoring member and diverging outwardly therefrom, said plates slidably bearing upon the tiltable plate 36 and being connected with each other at their inner ends by links 38, 38, and at their outer ends by lost motion links 38ª, 38ª.

Said small plates 37 are prevented from dropping substantially from the tiltable plate 36, when the latter is inverted, by reason of the middle one of them, located at the toe of the vamp, being secured at its outer end to the tiltable plate 36 by a pivot-pin 39, and the end ones of the U-shaped series being slidably held against said tiltable plate, each by a rivet 40 mounted in a cam slot 41 in the tiltable plate 36. Each of said rivets is provided with a stud 40ª (Fig. 3) projecting from its head on the reverse side of the plate 36, adapted to be engaged by the forked end of an angle lever 42, actuated by means presently to be described, said angle lever being pivoted at 42ª on said reverse side of the plate 36 and adapted to slide said rivets in their respective cam slots 41 and thereby change the curvature of the U-shaped stock-anchoring member 35 throughout its length, the plates 37 spreading apart at their outer ends until stopped by the links 38ª, and the legs of the U then swinging toward each other, these movements being incident to the operation of drawing the toe-margin of the vamp against the sole-edge of the last after the tiltable plate 36 has been turned over into vamp-applying position.

*Instep pullers.*

The tiltable plate 36 also carries a pair of instep-pulling pads 43, 43, adjustably secured, as shown clearly in Figs. 2 and 3, to the outer ends of respective arms 44, 44 pivoted on the reverse side of the plate 36 at 45, 45, said arms being connected with the respective angle levers 42 by links 46, 46, and thereby adapted to be swung toward each other to force the pads 43 past the instep curves of the sole, below the sole face of the last, as will be understood by reference to Fig. 8, so as to draw the upper against the instep of the last, concurrently with the application of the toe-margin of the vamp by the U-shaped member 35. For holding said U-shaped member 35 and the instep-pulling pads 43 normally in opened-out position, each of the angle levers 42 is connected with the tiltable plate 36 by a pull spring 47 (Fig. 3).

*Vamp-supporting block.*

A block 34$^b$ (Figs. 1 and 2) adapted to support the central portion of the vamp as the latter is received by the toe-anchoring pad 35 is mounted upon the table 20, and 34$^c$ is a slotted gauge block adjustably secured upon the supporting block 34$^b$ by suitable bolts and wing nuts 34$^d$, 34$^d$, for facilitating the positioning of the vamp, the wings of the latter straddling said gauge block. The supporting block 34$^b$ is adapted to hold the vamp in a substantially flat condition while its margins are being attached to the toe-stretcher and heel-stretchers, and the gauge block 34$^c$ assures that the vamp will be so positioned upon said stretchers that when they move through their predetermined course to the last the vamp will have exactly the right position with relation to the latter, even a slight misplacement being very undesirable. The gauge block 34$^c$ may be adjusted for different sized shoes.

*Heel-stretchers.*

The two heel-stretchers, which are provided with means presently to be described for carrying them through a series of movements including an over-swinging movement, from stock-receiving to stock-applying position, concurrently with the similar movement of the toe-stock anchoring member 35, are designated 48 and 49 (see Figs. 16 and 17 especially), and each consists of a pair of shell-like plates 48$^a$, 48$^b$, or 49$^a$, 49$^b$, rigidly secured together at one side but slightly separated at the opposite side, each pair of plates thus forming a roughly tubular, flattened structure open at the ends and slotted along one edge as indicated at 48$^c$, 49$^c$, to give access to the work to a stock-trimming knife 33 running within the tubular structure, as will hereinafter be described.

The slotted edge or side of each heel-stock-anchoring structure or member conforms to the medial, vertical contour of the heel portion of the last, and said structure is pivoted on its support, namely, a plate 48$^d$ or 49$^d$, as indicated at 48$^e$, 49$^e$, and connected therewith by a pull spring, 48$^f$, 49$^f$, to permit it to accommodate its position to said contour of the last as it is presented to the latter from the rear while held in a vertical attitude, thus applying the stock progressively from the heel toward the top of the last. Each of these heel-stretchers is provided with an inset, stock-holding pad 48$^g$, 49$^g$, on its side which is in the lead when the member is moved laterally of the last to carry the stock around the heel, said sides being uppermost when the members are in the stock-receiving position of Figs. 1 and 2 and so adapted to receive and adhesively hold the wings or heel portions 34$^a$, 34$^a$ of the vamp. The stock-holding pads 48$^g$, 49$^g$, are preferably of rubberized fabric, to which cement may be applied from time to time, to assure the adhesion of the stock thereto.

The heel-stretcher 48 (Fig. 16), which is the nearer of the two in Figs. 1, 7, 8 and 9, being the first of the two to act in swinging its stock around the heel and applying it thereto, as indicated in Fig. 16, is adapted to permit the stock-trimming knife to cut the vamp stock against the shoe-parts previously applied to the last, while the member 49, which thereafter presents its margin of stock, is provided with a plate 49$^h$ adapted to serve as a backing for the vamp stock, against which plate the knife cuts, the supporting structure, 49$^i$, of said plate being pivoted at 49$^j$ to the rear portion of the stock-anchoring structure 49, as shown clearly in Fig. 17, and provided with a hinge-spring 49$^k$ for throwing the plate 49$^h$ across the slot 49$^c$, over the vamp stock, and with a latch 49$^l$ for holding said plate 49$^h$ away from said position to permit the free application of the stock to the pad 49$^g$. Some of these features are shown also in Fig. 6, which shows in broken lines the heel-stretcher 49 as it appears in horizontal, stock-receiving position, as viewed from the left of Fig. 2, and in full lines said heel-stretcher in its vertical position, as it is returned to its receiving station from stock-applying position, before being turned over by hand, about a moving pivot 49$^m$ (Fig. 6), into the horizontal stock-receiving position. Said moving pivot, 49$^m$, is the connection of an ear 49$^n$ on the heel-stretcher-supporting plate 49$^d$ with a link 49$^o$, the other end of which link is pivoted at 49$^p$ to an apertured guide-plate or cross-head shoe 49$^q$ secured on the end of a rack-bar 49$^r$, said rack-bar having supporting and actuating mechanism presently to be described. An ear 49$^s$ formed on the lower portion of the plate 49$^d$, as viewed in Fig. 6, is pivoted to the end of a head 49$^t$, said head being cut away to admit the link 49$^o$ and secured upon the ends of a pair of slide-bars, the nearer one of the latter being shown at 49ᵘ, said slide-bars being mounted in apertures of the cross-head shoe or guide-plate 49ᵍ and adapted freely to slide therein as the heel-stretcher is turned between horizontal and vertical position about the moving pivot 49ᵐ. The head 49ᵗ is adapted to abut the face of the guide-plate 49ᵍ to limit the movement of the heel-stretcher toward the vertical position, and the heel-stretcher is provided with a stop 49ᵛ adapted to abut the top of said guide plate to limit said heel-stretcher's movement toward the horizontal position.

For yieldingly holding the heel-stretcher 49 in either its horizontal or vertical position, while permitting it to be turned from the former to the latter by its momentum or gravity when the mechanism is inverted, to twist the wings of the vamp into vertical planes, and to be turned back by hand, it is connected by a pull spring 49ʷ with the guide plate 49ᵍ, said spring acting over-center with regard to the pivot 49ᵐ.

As shown in Fig. 6, the heel-stretcher 49 is provided with a face-plate 49ˣ which provides its sliding surface against the heel-stretcher supporting plate 49ᵈ, and said face plate 49ˣ is formed with an overhanging or half-dove-tail edge 49ʸ adapted to interlock with a complementary dove-tail flange 49ᶻ on the plate 49ᵈ to prevent excessive strain on the pivot pin 49ᵉ, said dove-tail edges or flanges being curved substantially concentrically with the pivot 49ᵉ (this feature not being shown, but readily understood by reference to Fig. 6), so that the heel-stretcher may turn about said pivot in adjusting itself to the last while said dove-tail flanges continue in engagement. Suitable stops shown at 48′, 48′ (Fig. 9), as to the stretcher 48, are provided for limiting the turning of the heel-stretcher 49 upon the plate 49ᵈ, as said heel-stretcher is pressed against the last or underaction of the spring 49ᶠ, when the heel-stretcher recedes rearwardly from the last.

With the exception of the cutting plate 49ʰ and its mountings, the heel-stretcher 48 is supported by and associated with parts corresponding to those above described with respect to the heel-stretcher 49, and such parts, so far as shown, are given the numeral 48 with the same exponent given with the numeral 49 in referring to the heel-stretcher 49.

*Heel-stretcher frame.*

The heel-stretchers 48, 49 are supported, by their respective rack-bars 48ʳ, 49ʳ and slide bars 48ᵘ, 49ᵘ, from a skeleton, heel-stretcher frame pivoted concentrically with the pivot of the plate 36, said frame comprising two parallel pairs of slide-guiding, radius bars 50, 50ᵃ, 51, 51ᵃ, (see especially Fig. 2) connected at their outer ends by a cross-member 52 of angle iron, and corner blocks 52ᵃ, 52ᵃ, and said cross-member 52 serves as a handle in turning the heel-stretcher frame and the pivoted toe-stock-supporting plate 36 over from the stock-receiving position of Figs. 1 and 2 to the stock-applying position of Figs. 7, 8 and 9, and in reversing this movement. In these movements the plate and frame are adapted to travel as well as turn pivotally, as will presently be described.

Mounted upon the respective pairs of frame-bars 50, 50ᵃ, 51, 51ᵃ, are slides 53, 54, each normally held at a position a little way from the cross-member 52 of the frame by a compression spring 55 on the bar 50 or 51 and an opposed, adjustable pull spring 56 (Figs. 1, 7, 8 and 9) connecting the slide with a part of the pivoted frame adjacent said cross-bar.

The rack bars 48ʳ, 49ʳ and slide-bars 48ᵘ, 49ᵘ of the heel-stretchers are slidably mounted, at right-angles to the slide-guiding frame-bars 50, 50ᵃ, 51, 51ᵃ, in suitable guide apertures in the respective slides 53, 54, the teeth of each of the rack-bars 48ʳ, 49ʳ being meshed with a pinion, 57, 58, mounted in a recess in the slide and splined upon a shaft, 59, 60, said shafts being rotatably and slidably mounted in the respective slides parallel with the radius bars of the frame and adapted to be turned successively, by means hereinafter described, after their frame has been turned over onto the last, first to run the heel-stretcher 48 transversely of the machine, inward to its medial, stock-applying position, then slightly past said position to disengage the severed margin of stock after the trimming knife has operated, and then to retract it, and then to so run and retract the heel-stretcher 49.

For moving each of said heel-stretchers forward against the last when it is so run in to its medial position, the heel-stretcher having at this stage fallen into the vertical position as shown, with regard to heel-stretcher 48, in Figs. 7, 8 and 9, and with regard to the heel-stretcher 49, upside down, in Fig. 6, each of the slides 53, 54 has adjustably secured thereto a pull-bar or silde bar, the one for the slide 53 being shown at 60ᵃ, parallel with the radius bars of the pivoted frame, the opposite end portion of said slide bar being slidably mounted in a bracket 61 secured to the adjacent pair of radius bars, and said slide bar is provided with a laterally projecting cam roller 62 running in the elbow of a cam-arm 63, the latter being pivoted upon a bracket 64 secured to the adjacent radius bars and provided with a hinge spring 65 to hold it in association with the roller 62 as the pivoted frame is turned to the stock-receiving position of Fig. 1. The outer end of the cam-arm 63, with the pivoted frame as positioned in Figs. 7 and 8, is adapted to be engaged by a cam or dog 53ᵃ, hereinafter described, to pull the slide 53 along the radius bars 50, 50ª, against the action of the pull spring 56, the reaction of said pull spring returning said slide against the compression spring 55 when the cam or dog 53ª has passed from under the cam arm 63. 66 is the nearer of a pair of stop-posts for the pivoted frame above described, each of said posts having a hollow upper end adapted to receive a rounded stud 61ª formed on the bracket 61 or its fellow at the other side of the machine. Cam members, the nearer of which is shown at 66ª (Fig. 1), are mounted upon the table 20 and adapted to crowd the respective slides 53, 54, against the springs 55, as the heel-stretcher frame reaches loading position (Figs. 1 and 2), to assure the accurate positioning of the heel-stretchers to receive the vamp.

*Actuating mechanism.*

As above stated, the pivoted frame carrying the heel-stretchers and the tiltable plate 36 carrying the toe-stock anchoring member 35 are concentrically pivoted and they are adapted to move bodily as well as to turn over their pivot, near the toe of the stock, from their stock receiving position of Figs. 1 and 2 to their stock-applying position of Figs. 7, 8 and 9. When said frame is stopped in its pivotal movement by the posts 66, at which time the heel-stretchers by reason of their momentum and weight snap into vertical position, overcoming their over-center springs 48ʷ, 49ʷ, and thus hold the wings of the upper alongside and parallel to the heel of the last, the plate 36 requires to be further turned downward, from its position in Fig. 7 to its position in Fig. 8, to carry the toe margin down to the sole of the last.

Figure 10:
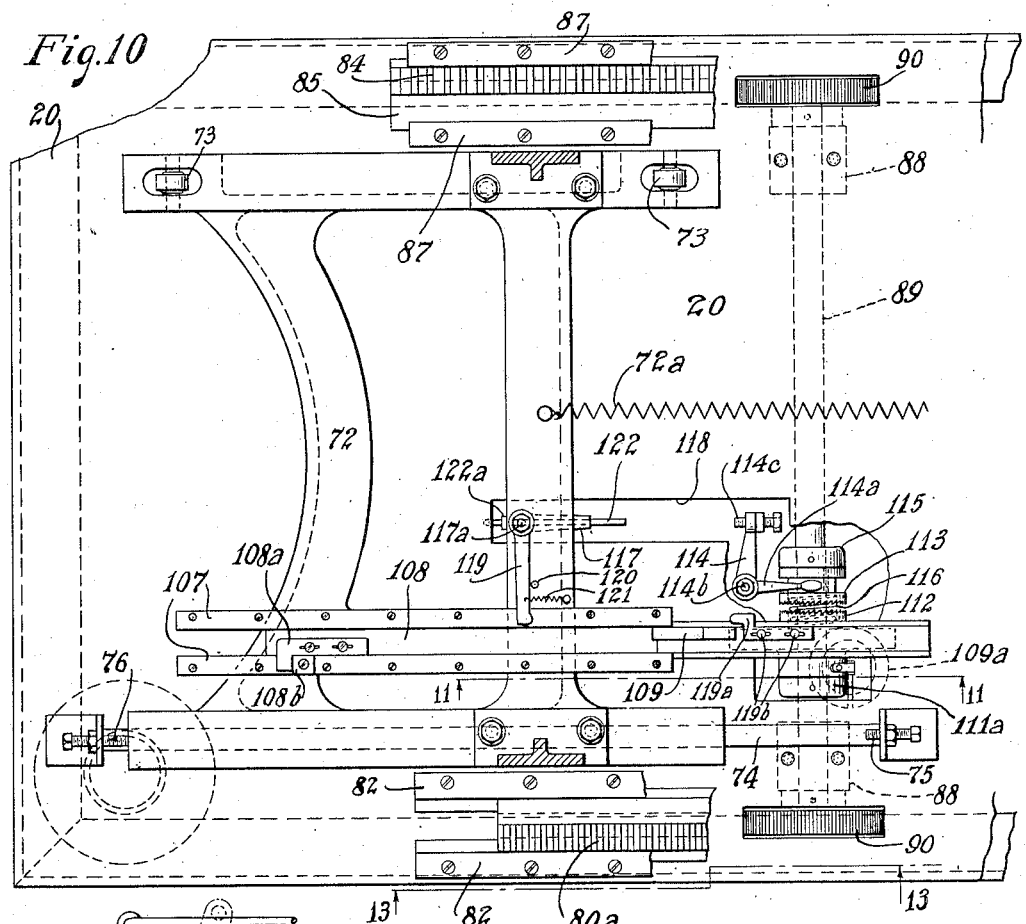
Fig. 10 is a plan view of part of the operating mechanism, including devices for tripping the slide carrying the cam which contracts the toe-stretcher.

The plate 36 is provided at its respective sides with parallel arms 67, 67ª (Fig. 2), approximately in its own plane, said arms being apertured and mounted upon respective stub shafts 68, 69. The arm 67 is secured against rotation upon its stub-shaft 68 by a pin 67ᵇ, while the arm 67ª is rotatably mounted upon its stub-shaft 69. Said arms extend beyond said shafts, their outer ends being provided with transverse, spring-backed plungers or latching pins 70, 70. Said stub shafts are rotatably mounted in respective bearing brackets 71, 71 rising from a carriage 72 extending across the table 20 under the parts heretofore described and supported on said table at the far side, as viewed in Figs. 2 and 10, by rollers 73, 73 running on suitable track-ways and at the near side by a rail 74 upon which the carriage slides. Adjustable stops 75 (Figs. 2, 7 and 10) and 76 (Figs. 1 and 10) are mounted upon the table 20 to limit the movement of said carriage, and a pull spring 72ª connecting it with a part of the table is adapted to urge it toward the last pedestal 21, which is to say toward stock-applying position.

Each pair of the parallel radius bars 50, 50ª, 51, 51ª of the pivoted frame is provided with a bearing member 77 (Fig. 8) clamped upon the inner ends of the bars, said bearing member being forked (Fig. 2) to straddle the bearing portion of the corresponding arm, 67 or 67ª of the tiltable plate 36, and the fork-arms 77ª, 77ᵇ of each said bearing member being apertured and rotatably mounted upon the stub-shaft 68 or 69 on respective sides of the plate-arm, 67 or 67ª.

The innermost fork-arm 77ª of each of said bearing members extends beyond the stub-shaft 68 or 69, alongside the adjacent plate arm, 67 or 67ª, and is formed with a dimple adapted to receive the adjacent one of the spring-pressed latching pins 70 to hold the plate 36 and the heel-stretcher frame substantially parallel as they are swung over from the position of Figs. 1 and 2 to that of Fig. 7, but by the forcible dislodging of said latching pin from said dimple to permit the further turning of said plate to its position in Fig. 8, against an adjustable stop 36ª, after said frame has been stopped by the posts 66, and likewise to hold them substantially parallel in the corresponding part of the reverse movement.

For assisting the movement of the carriage 72 and so assisting the over-swinging pivotal movement of said plate and frame effected by means of the handle bar 52 of the latter, and for the further turning of the plate 36, as well as to actuate certain cam-carrying frames hereinafter described, the stub-shaft 69, which it will be observed is loosely journaled in the members heretofore mentioned, has secured on its outer end a hand wheel 78 and a gear 79, the latter meshing with a two-faced rack bar 80, having teeth 80ª on its top face and teeth 80ᵇ on its bottom face, said rack bar being the base or lower, horizontal member of a generally rectangular, vertically positioned, skeleton, cam-carrying frame 81, through the central open space of which the stub-shaft 69 extends, said rack being slidably mounted, for longitudinal movement on the table 20, between grooved guide-rails 82, 82 secured upon said table. The opposite stub-shaft, 68, has adjustably secured on its outer end a gear 83, of less diameter than the gear 79, the slots and screws for its angular adjustment being shown respectively at 83ª, 83ᵇ (Fig. 1). Said gear is meshed with a relatively short rack 84 adjustably secured by bolts 84ª, 84ª (Fig. 1) upon the lower, horizontal member 85 of a generally rectangular, vertically positioned, skeleton, cam-carrying frame 86, through the central open space of which the stub-shaft 68 extends. Said lower horizontal, cam-carrying-frame member or rack bar 85 is slidably mounted for longitudinal movement upon the table 20, between grooved guide rails 87, 87 secured upon said table, and is formed on its bottom face with rack-teeth 85$^b$. The rack 84, by movement to the right as viewed in Figs. 1, 7 and 8, after the gear 83, with the carriage 72, has moved to its leftward limit with the gear running on the then stationary rack, is adapted to drive said gear to turn the plate 36 from its position in Fig. 7 to that of Fig. 8.

Journaled in suitable brackets 88, 88 depending from the table 20, under the rack members 80 and 85, is a transverse shaft 89 having secured on its respective ends gears 90, 90 of equal size, meshed respectively with the bottom rack teeth 80$^b$, 85$^b$ of the rack members, 80, 85, and thus adapted to compel the parallel cam-carrying frames 81, 86 to move equally, the frame 81 being driven by the gear 79.

Rotatably mounted upon the stub-shafts 68 and 69 respectively, just outside of the respective brackets 71 of the carriage 72, are plates, that for the stub-shaft 69 being shown at 91 (Fig. 2), to which plates are adjustably secured, by means of screw bolts 91$^a$, 91$^a$ (Fig. 2, 7 and 8), respective segmental, bevel gears, one of the latter being shown at 92, said segmental gears being provided with respective radial cam arms 93, 94 each provided with a laterally projecting cam roller, 93$^a$, 94$^a$, on its outer end, said rollers being adapted to be engaged by respective cams presently to be described for turning said segmental gears. The shafts 59, 60, above described as being adapted, through the pinions 57, 58 respectively splined thereon, to run the heel-stretchers transversely of the machine, rotatably extend through the respective brackets 61 above described and also through respective brackets 95, 95 slidably mounted on the adjacent radius bars 50, 50$^a$ or 51, 51$^a$, of the heel-stretcher frame, near the segmental gears 92, and each of said shafts has secured on its inner end a beveled pinion 96 meshed with the adjacent segmental gear, the latter being thus adapted, when turned by its cam, above referred to and hereinafter described, to drive the shaft 59 or 60, and thereby run the heel-stretcher 48 or 49 toward the middle of the machine. For returning the heel-stretcher to the side of its frame, when the cam roller 93$^a$ or 94$^a$ is freed from its cam, so that the heel-stretcher will clear the last as the frame is swung back to loading position, and will be positioned to receive the next flat upper, a helical torsional spring 97 is mounted upon each of the shafts 59, 60, and has its respective ends anchored in a collar 98 secured upon the shaft in abutment with the slidable bracket 95, and in a knurled washer 99 slidably and rotatably mounted upon said shaft and provided with a dowel stud 99$^a$ (Fig. 9) adapted to enter a hole in the bracket 61, this arrangement being such that the force of the torsional spring 97 may be varied by sliding the knurled washer 99 on the shaft against the action of the spring, turning it to twist or untwist the spring, and again permitting the thrust of the spring to press the washer against the bracket 61 with its dowel stud in the hole of the latter. The bracket 95 being slidably mounted on the rods of the heel-stretcher frame, the beveled pinion 96 may be unmeshed with its segmental gear by sliding said bracket and the shaft outward against the thrust of the spring 97, and then allowed to return into mesh with the said gear under action of said spring at a different point on the gear, the latter meanwhile being given a partial turn, to adjust the position of the corresponding heel-stretcher with relation to the cam-arm, 93 or 94, of the gear.

The arrangement so far described is such that, with the tiltable plate 36 and the heel-stretcher frame and related parts in loading position, as shown in Figs. 1 and 2, the over-swinging of the handle bar 52, which may be indirectly assisted as stated by turning the hand-wheel 78 counter-clockwise as viewed in Fig. 1, permits the pull-spring 72$^a$ (Fig. 10) to pull the carriage 72 toward the shoe last 26 until it abuts the stop 75 (Figs. 2 and 10), the gear 83 turning with the plate 36 and running on the rack 84, which is stationary until the over-swung frame is stopped by the posts 66, while the larger gear 79, its stub-shaft being loosely journaled in the plate-arm 67$^a$ and the bearing member arms 77$^a$ and 77$^b$, runs an equal distance but at less angular speed, upon the upper teeth of the now stationary rack-bar 80, the cam-carrying frames of which these rack members are parts, being at their left-hand limit as viewed in Figs. 1, 7 and 8, suitable stops (not shown), being provided to limit their range of movement in each direction. The heel-stretcher frame and the plate 36 thus travel bodily toward the last while being swung over their pivots.

When the heel-stretcher frame is stopped by the posts 66, further turning of the hand-wheel 78 runs the cam-carrying frames 81, 86 to the right as viewed in Figs. 1, 7 and 8, and in the beginning of this movement the latter part of the rack 84, driving the gear 83, turns the plate 36 from the position of Fig. 7 to that of Fig. 8, said rack then leaving said gear. A cam-plate 100 mounted in the cam-carrying frame 86 is adapted to run with its edge in contact with an adjustable stud 101 (Figs. 1 and 7) projecting from the inner face of the gear 83, the adjustment slots and nuts of said stud being shown at 101$^a$, 101$^b$, to hold said gear in proper angular position to again mesh with the rack 84 upon the subsequent return of the latter.

An adjustable rest 36ª serves as a support for the free end of the plate 36 when it is in the position shown in Fig. 8.

Heel-stretcher-actuating cams.

The cam-carrying frame 86 is provided with a cam 86ª, pivoted at 86ᵇ on the inner face of the cam plate 100 and having a guide-stud 86ᶜ slidably mounted in a slot 86ᵈ in said plate, said cam being adapted to engage the cam roller 93ª on the arm 93, as the frame 86 moves forward as described, (Figs. 7 and 8) to run the heel-stretcher 48 inward to its medial position, indicated in dotted lines at 86ᵉ (Fig. 9), and hold it there while the trimming knife operates, and then, through the action of a terminal rise 86ᶠ on said cam, to run said stretcher beyond said medial position, to the dotted position shown at 86ᵍ in Fig. 9, to disengage the severed margin of stock, after the trimming knife has operated, the reaction of the torsional spring 97 then retracting the heel-stretcher when the roller 93ª has passed from said cam 86ª. The cam 86ª, being pivoted as described, passes over the roller 93ª inoperatively during the return movement, leftward as viewed in Figs. 1, 7 and 8, of the cam-carrying frame 86, said return movement being effected by turning the hand wheel clock-wise as here viewed before the heel-stretcher frame and plate 36 are swung back to loading position, the reaction of the torsional spring 97 having thrown the cam arm 93 to its lowermost position in retracting the heel-stretcher 48. A generally similar cam 81ª, on the frame 81, (Figs. 7 and 8) is provided for operating the heel-stretcher 49 in like manner but after the heel-stretcher 48 has been run in and retracted. For pulling the slide 53 inward on the rods 50, 50ª, when the heel-stretcher 48 has been run in to its medial position, to present said heel-stretcher to the last from the rear, the frame 86 carries a cam 53ª adapted to actuate the adjacent cam arm 63. In the subsequent return movement of the frame 86, the hinge spring 65 of the cam arm 63 permits the latter to be swung away from its roller 62 by the cam 53ª as the latter passes it inoperatively, but returns the arm against the roller when the cam has so passed. A similar, later timed cam 54ª, is provided on the frame 81 for similarly presenting the heel-stretcher 49 to the last from the rear when it has been run to its medial position by the cam 81ª. The frames 81, 86 also carry respective cams, 81ˣ (Fig. 2), and 86ˣ (Figs. 1 and 7), adapted to engage the respective cam rollers 93ª, 94ª, as the gears 79, 83 subsequently run on their racks back to loading position when the heel-stretcher frame is swung over, said cams, acting against the springs 97, being adapted to assure the accurate positioning of the heel-stretchers laterally of the machine to receive the next upper or vamp. Said cams may also be so formed and the springs 97 may be so tensioned that the latter will cause the heel-stretchers to separate slightly to clear the last as their frame is swung over to stock-applying position, the springs so moving the heel-stretchers when the turning of the frame swings the rollers 93ª, 94ª from said cams.

Toe-stretcher-actuating mechanism.

Figures 11, 13:
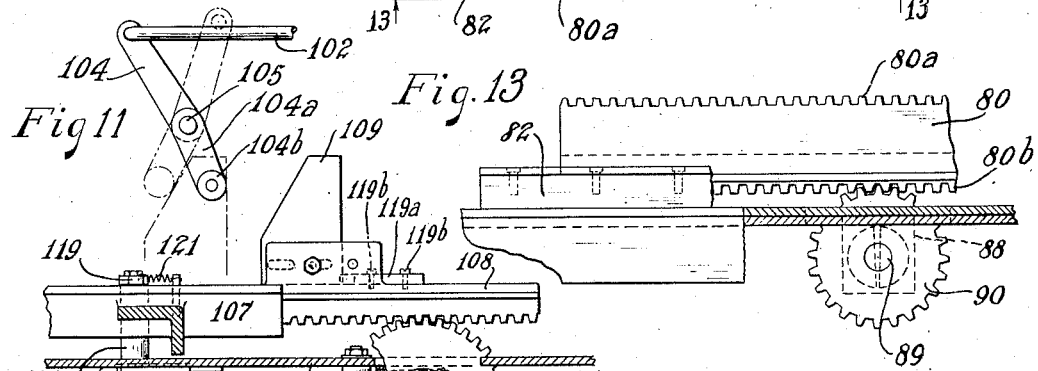
Fig. 11 is a section on the line 11—11 of Fig. 10.
Fig. 13 is a section on the line 13—13 of Fig. 10.
Figure 12:
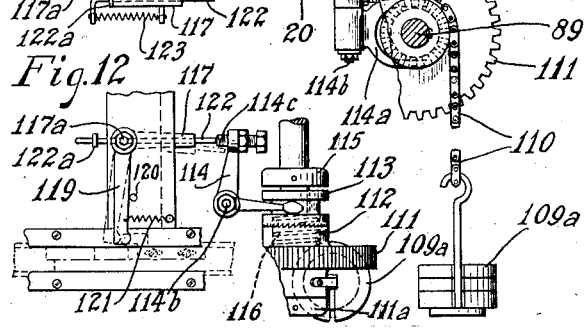
Fig. 12 is a plan view showing in its engaged position the clutch which is disengaged in Fig. 10.

For actuating the angle levers 42 on the reverse side of the tiltable plate 36 and thereby closing the toe pressing pad 35 and the instep pressing pads 43 upon the last, said levers are connected by links 102, 102 with respective levers, 103, 104 extending through slots in the plate 36 from a rock-shaft 105 mounted in brackets 106, 106 on the opposite, work-receiving side of said plate, and one of said levers, 104, is formed with a cam arm 104ª (Figs. 2 and 5) having a laterally projecting cam roller 104ᵇ on said work-receiving side of the plate. Mounted between longitudinal, grooved, guide rails 107, 107 on the carriage 72 is a rack 108, (Figs. 10, 11 and 12) toothed on its bottom face and having secured on its back a vertical plate cam 109 adapted to engage the roller 104ᵇ of the cam arm 104ª, the tiltable plate 36 being in stock applying position, to turn the rock-shaft 105. Said rack 108 is provided with a stop 108ª adapted to abut a stop 108ᵇ on one of its rails 107 to limit its movement toward its resting position, at the right in Fig. 10, and is adapted to be urged toward said position by a weight 109ª suspended by a windlass chain 110 secured to the hub of a gear 111 loosely journaled on the transverse shaft 89, abutting a stop collar 111ª secured on said shaft, said gear being meshed with said rack. For driving said gear against the force of said weight, to run the rack 108 to the left as viewed in Fig. 10 and thereby carry the plate cam past the roller 104ᵇ, the opposite side of said gear's hub is formed with ratchet teeth, thus constituting a clutch member 112 adapted to be engaged by a complementary clutch member 113 grooved to accommodate a shipper fork 114ª formed on a two-armed tappet lever 114, said clutch member 113 being splined upon the shaft 89 and normally held out of engagement, against a stop-collar 115 secured on said shaft, by a helical compression spring 116 mounted on said shaft and having its ends rotatably seated in axial recesses in said clutch members. The tappet lever 114 is pivoted on a vertical axis 114ᵇ on the under side of the table 20 and its tappet arm is provided with an adjustable tappet-bolt 114ᶜ. A horizontal sleeve 117 under the table 20, is formed with a vertical journal stem 117ª extending upward through a slot 118 in said table and the stem is rotatably mounted in an aperture formed in a cross member of the carriage 72.

The upper end of said stem, projecting above said cross-member, has secured to it a lever 119 at right angles to the sleeve 117 and yieldingly held against a stop 120 on said carriage by a pull-spring 121, to hold the sleeve 117 in alignment with the tappet bolt 114$^c$ of the lever 114. Slidably mounted in said sleeve is a plunger 122 provided with a stop-collar 122$^a$ and adapted to be urged in the direction of said tappet bolt by a pull spring 123 connecting its downwardly bent rear end with said sleeve, said plunger thus being adapted yieldingly to abut the tappet bolt 114$^c$ to throw in the clutch 113, 112 and thereby actuate the rack 108 to close in the toe-presser 35 and instep pullers 43 when the carriage 72 has reached the limit of its movement, toward the last, the cam 109 contacting the roller 104$^b$ when the hand wheel 78, after such movement of the carriage, has been further turned counter-clockwise, as viewed in Figs. 1, 7 and 8, through a sufficient range to throw the tiltable plate 36 down to the position of Fig. 8, through the driving of the rack-member 84 to the left as viewed in Fig. 10. For releasing the clutch 113, 112 and thus permitting the weight 109$^a$ to return the rack 108 to its resting position at the right of Fig. 10 after it has functioned as just described, said rack has a dog 119$^a$ adjustably secured thereon by screws 119$^b$, 119$^b$ and adapted to abut the lever 119 and through the latter to swing the sleeve 117 out of alignment with the tappet bolt 114$^c$, after the cam 109 has functioned, the lever 104 and cam 109 then being in the dotted positions of Fig. 11, to slide the plunger 122 off said tappet bolt, as indicated in dotted lines in Fig. 12, thus permitting the spring 116 to throw out the clutch and the weight 109$^a$ to retract the rack, the sleeve 117, under action of the spring 121, returning with its plunger into alignment with the tappet bolt, for the next operation, when the dog 119$^a$ is withdrawn by the retraction of the rack.

*Stock-trimming knife.*

The knife 33 heretofore referred to, for trimming the excess stock from the wings or heel portions of the upper as they are successively applied to the last, is shown in Figs. 14 to 17. It is secured on the outer end of the upper arm 124$^a$ of a bell crank lever 124, the latter being fulcrumed at 124$^b$ between fork arms formed on the upper end of a vertically slidable bar 125 mounted in a guide-way formed in a bracket 126 depending from the table 20 and provided with a retaining plate 127. The lower arm 124$^c$ of the bell-crank lever 124 has its outer end connected by a link 128 with an arm, 129, secured upon a rock-shaft 129$^a$ journaled in brackets, one of which is shown at 130, mounted upon the table 20. Another arm, 129$^b$, projects laterally from the other end of said rock-shaft and is provided with a laterally projecting cam roller 131 adapted to be engaged by successive pairs of cams 132, 133 and 134, 135 (Figs. 1 and 14), on the cam-carrying frame 81, during the forward movement of the latter, to the right as viewed in Fig. 1, to actuate the knife as the heel-stretchers in succession apply the wings of the upper to the last, the knife-supporting arm 124$^a$, being, in each cutting operation, first thrown to vertical position and then raised with the bar 125 by the cam 132 or 134, and then swung against the work and drawn downward by the cam 133 or 135.

The vertically slidable bar 125 is provided at its upper end with adjustable stop bolts 136, 137, adapted to limit the angular movement of the bell-crank lever 124 at the positions shown respectively in full lines and in dotted lines in Fig. 14, and the lower arm 124$^c$ of said lever is connected by a pull spring 138 with the lower end of the bar 125, to hold the lever 124 against the stop 137 when the cam roller 131 is free from its cam. Said spring also assists the arm 129 in holding the knife 33 against the work as said knife is drawn downward, in its cutting movement, with its supporting bar 125, by the cam 133 or 135. The vertically slidable bar 125 is provided with a one way brake, 139, the details of which are shown in Fig. 18, adapted to resist its downward movement so as to assure that the downward pull of the arm 129 upon the bell-crank arm 124$^c$ will hold the knife firmly against the work while pulling said knife downward with the slidable bar 125 upon which it is mounted. Said brake comprises a friction member 140 adapted to bear against the bar 125, said member being mounted upon a backing member 141 mounted in a slot 142 in the bar's retaining plate 127, and said backing member being formed on its outer face with a recess containing a metal ball 143 bearing against an inclined plate 144 secured to the retaining plate 127, this arrangement being such that the downward force exerted by the bar 125 upon the friction member 140 wedges the latter with its backing member 141 and its ball 143 between the bar 125 and the inclined plate 144, thereby increasing the pressure and braking effect of the member 140 upon said bar. It will be seen that the upward movement of the bar 125, on the contrary, in upwardly displacing these wedging members, reduces and substantially nullifies their braking effect. A compression spring 145 is interposed between the backing member 141 and a bracket 146 thereover, said bracket being secured to the retaining plate 127, for lightly holding the wedging members in braking position so as to be more tightly wedged by downward drag of the bar 125.

Knife heater.

To facilitate the cutting of the stock by the knife 33 a burner 147 is so positioned on the table 20 that its flame will heat said knife, as shown in Fig. 14, when said knife is in the full line position there shown, which it assumes between cutting operations. A cover 148, slotted to receive the knife arm 124$^a$, is provided for said burner.

Seam-rolling device.

The seam rolling device, shown in Figs. 1 and 19, comprises a rough-treaded roller 149 mounted on the end of one arm, 150$^a$, of a bell crank lever 150, the latter being fulcrumed at 150$^b$ on a slide 151 mounted for vertical movement upon the post 29 and constantly urged upward by a weight 152 connected with said slide by a chain 153 running over a pulley 154 loosely journaled on said post. The other arm, 150$^c$, of the bell crank lever is connected by a link 155 with an arm 156 projecting from the inner end of a transverse rock-shaft 157, the latter being mounted in suitable brackets, one being shown at 157$^a$, upon the table 20, the outer end of said rock-shaft being provided with a cam-actuated arm 158 provided with a laterally projecting cam roller 159 adapted to be engaged by a cam 160 pivoted upon a bracket 161 carried by an extension of the cam-carrying frame 86, during the leftward or return movement of the latter, to throw the roller 149 against the work and draw it downward along the heel seam, the slide 151 being drawn downward, lifting the weight 152, as the downward pull of the link 155 continues after the roller has been swung into contact with the work. The rock-shaft 157 is provided with a suitable torsion spring 157$^b$, mounted thereon and having its ends anchored in said rock-shaft and in one of its brackets respectively, to cause the arm 156 to rise as soon as the roller 159 passes from its cam, to clear the work as the slide 151 is returned upward by the weight 152.

Mounting of pivoted cams.

The cam 160, in order that it may pass over the roller 159 inoperatively during the first, forward movement of the cam-carrying frame 86, and in order that its position and pitch may readily be adjusted, is pivoted upon a stud (not shown) eccentrically positioned upon the inner side of a disc 162 rotatably mounted in the bracket 161, the outer side of said disc being provided with a lever 163 having a slotted outer end in which is mounted a clamping bolt 164 projecting from the bracket 161, the clamping of said lever in different angular positions serving to secure the pivot stud of the cam at corresponding positions. The cams 132 and 134 are similarly pivoted, so that they may pass inoperatively over the cam roller 131 of the cutting device during the return movement of their frame 81, their pivot studs being shown respectively at 132$^a$, 134$^a$ (Fig. 1), their discs at 132$^b$, 134$^b$, and the clamping lever for the cam 132 being shown in Fig. 14 at 132$^c$. The vertical plates upon which these cams are mounted are formed with several arcuately arranged clamping-bolt holes to increase the range of adjustment afforded by the slots in the ends of their levers, such holes, with respect to the cam 132, being shown at 132$^d$, 132$^d$ in Fig. 14, and the clamping bolt, 132$^e$, being adapted to be mounted in any of said holes.

Last gauge.

For facilitating the exact positioning of the shoe last 26 with respect to the vamp-applying mechanism, a forked gauge member 165 is hinged upon a bracket 166 secured to the edge of the plate 36 which is adjacent the last when said plate is in loading position, as shown clearly in Fig. 2, the forks of said gauge member being adapted to receive the toe of the last between them as there shown. Said gauge member is provided with a hinge spring 167 to permit it yieldingly to contact the sole of the last, without raising the latter, when it is brought up to the toe of the last by the turning of the plate 36 back to loading position.

An angle iron 168 secured to the table 20 (Fig. 1) is adapted to serve as a stop or rest for the handle-bar 52 of the heel-stretcher frame when the latter is in loading position.

Operation.

In the operation of the machine, the parts being in the position shown in Figs. 1 and 2, the upper or vamp, 34, with its last-contacting side uppermost, is laid upon the supporting block 34$^b$, about the gauge 34$^c$, as shown best in Fig. 2, and its margins adhesively anchored to the toe-stretcher 35, and the heel-stretchers 48, 49, the knife backing plate 49$^h$ being swung on the pivot 49$^j$ to admit the stock and then permitted to close upon the latter under action of its spring 49$^k$. The shoe last, with the inner parts of a shoe thereon, is mounted upon the pedestal 21 and clamped thereon by means of the arm 28. The cam-carrying frames 81, 86 are at their leftward limit, as viewed in Fig. 1, wherefore the weight of the heel-stretcher frame, the plate 36, and their associated parts, holds the carriage 72 at its right-hand or outward position, against or adjacent the stop 76, against the pull of the spring 72$^a$. The heel-stretcher frame, together with the tiltable plate 36 and their associated parts, are then swung over toward the last by means of the handle bar 52 to invert the vamp and present it from above to the last. During this over-swinging movement the gears 79, 83 run respectively upon the now stationary racks 80ª, 84, the vamp thus being moved bodily toward the last as well as turning over, and the carriage 72, being pulled by the spring 72ª, correspondingly moves toward the last until it abuts the stop 75. When the carriage is thus stopped, or immediately thereafter, the turning movement of the heel-stretcher frame is suddenly stopped by the posts 66, and the weight and momentum of the heel-stretchers thereupon causes them to snap into vertical position as above described.

Further turning of the hand-wheel 78 in the same direction, the carriage being stopped as stated, drives the cam-carrying frame 81, through the gear 79 and rack teeth 80ª, to the right as viewed in Fig. 1, and through the rack teeth 80ᵇ, gears 90 on the shaft 89, and the rack teeth 85ᵇ, drives the cam-carrying frame 86 in the same direction and at the same speed as the frame 81. This forward movement of the frame 86, through the rack 84 thereon, drives the gear 83 and thereby further turns the plate 36, about its now stationary pivot, from its position in Fig. 7, to that in Fig. 8, to pull the margins of the vamp downward about the toe portion of the last.

Just before the carriage 72 abuts the stop 75, the plunger 122 abuts the tappet bolt 114ᶜ, throwing in the clutch 112, 113, so that the rack 108 is driven forward, at a higher speed than the frames 81, 86, by reason of the large size of its gear 111, and its cam 109 contacts the roller 104ᵇ and through parts above described closes the toe-stretcher 35 and instep pullers 43 inward with respect to the last to pull the upper stock respectively about the edge of the toe-portion or the last and into the instep curves of the latter. This action completed, the dog 119ª strikes the arm 119, thus releasing the clutch 112, 113, through parts above described, and permits the weight 109ª to return the rack 108 for the next operation.

At about the same time that the toe-stretcher and instep pullers are thus operated the forward movement of the frames 81, 86, to the right as viewed in Figs. 1, 7 and 8, brings first the cam 86ª into contact with the roller 93ª on the arm 93, which latter has been thrown to its lower position by the over-swinging of the heel-stretcher frame, and said cam, through parts above described, runs the heel-stretcher 48 inward to a medial position, and while it is so held by the straight, middle portion of said cam, as shown in Fig. 8, the cam 53ª contacts the arm 63 to move the heel-stretcher 48 forward against the last, through parts above described, and so hold it while the knife 33 is actuated and withdrawn by the cam 132, 133.

The terminal rise 86ᶠ of the cam 86ª then shoves the heel-stretcher 48 slightly beyond its medial position, substantially to the position indicated by broken lines at 86ᵍ in Fig. 9, to disengage the severed margin of stock from the work. The pull spring 56 then retracts the heel-stretcher 48 rearwardly from the last and, the cam 86ª leaving the roller 93ª, the spring 97 runs the heel-stretcher back, laterally of the machine, to a position adjacent the frame bars 50, 50ª.

Similar operation of the heel-stretcher 49 is then effected by the cams 81ª, 54ª, and corresponding parts, the knife 33 being now actuated by the cams 124, 135, during the further outward movement of the frames 81, 86. When the latter have reached the forward limit of their movement, the hand-wheel 78 is turned in the opposite direction, clockwise as viewed in Fig. 1, to return said frames to their leftward limit as there viewed, and during this return movement the cam 160 actuates the seam roller 149 through mechanism above described. When the frames 81, 86 have reached their leftward limits as viewed in Fig. 1, further clockwise turning of the hand-wheel 78, assisted by means of the handle 52, runs the gears 79, 84 upon their respective racks, the carriage 72 moving against the pull of the spring 72ª, and the heel-stretcher frame and the plate 36, with the parts carried thereby, are thus swung back to loading position, the cam members 66ª augmenting the pull springs to cause the proper positioning of heel stretcher slides. The last with the work thereon is then removed, and the operation as described is repeated.

While the foregoing description relates to a last which is adhesively prepared by having the lining and the insole mounted thereon as it comes to the machine, it will be apparent that the invention is independent of the presence or absence of these inner shoe parts, and for the sake of brevity and clarity of expression the term "last" will be used in the appended claims as applying to a last either with or without these inner shoe parts thereon. The word "upper" also is intended to include an upper shoe part such as a lining.

It is also to be understood that applicant has used the word "lasting" in the appended claims in its broader sense, as relating to the application of shoe parts to lasts, and not in the more restricted sense of securing the margin of the upper to the insole.

An especial advantage of the heating of the knife is that it permits the knife to trim the first-applied heel margin, with the last and the shoe lining thereon serving as a backing plate for the knife to cut against, as shown in Fig. 16, without such sharpness of the knife or such force of the knife against the lining or the last as to cut or score the same, the heat of the knife causing the rubber to soften so as to cut easily and permit the passage of the knife without drawing and wrinkling of the cut margins by frictional contact with the knife.

Various modifications may be resorted to without departing from the scope of my invention, and I do not wholly limit my claims to the embodiment thereof described herein.

I claim:

1. The method of lasting shoes which comprises pulling an upper shoe part by its margin onto the last by non-progressive, adhesive engagement with the outer surface only of said margin.

2. The method of lasting shoes which comprises holding an upper shoe part and a last in determinate, isolated positions, bringing the last and said part together by determinate relative movement, and pulling said part onto the last by non-progressive, adhesive engagement with only the outer face of a marginal portion thereof.

3. The method of lasting shoes which comprises holding an upper shoe part and a last in determinate, isolated positions, bringing the last and said part together by determinate relative movement, and pulling said part onto the last and drawing its margins inward past the sole of the last by non-progressive engagement with its marginal portions only.

4. The method of lasting rubber shoes which comprises applying a raw gum upper to the last, and pulling its respective heel portions around the heel part of the last to apply them progressively thereto up to the position of the vertical heel seam by engagement with the outer face only of the upper.

5. The method of lasting rubber shoes which comprises sticking the bottom and rear edges of a raw gum upper by their outer surface to suitable toe and heel-stretchers, and by such engagement drawing said edges respectively past the sole at the fore-part, and around the heel, of a last.

6. The method of lasting rubber shoes which comprises applying the lining and inner sole of the shoe to a last, sticking the bottom and rear edges of the raw gum upper flatwise, by their outer surface, to suitable toe and heel stretchers, by such engagement drawing said rear edges around the heel part of the last and lapping them one over the other, and by such engagement drawing said bottom edge past the sole at the fore-part of the last.

7. The method of applying a rubber upper to a last having thereon the lasted underlying parts of a shoe which comprises presenting said upper to said lasted parts while holding it extended throughout its area by engagement with its outer face only, twisting the wing portions of the upper into substantial parallelism with the sides of the heel portion of the last while so holding them extended, drawing the toe margin of the upper, while it is so held, toward the sole-edge of the last to stretch the upper onto the lasted parts, and successively swinging the wing portions of the upper, while they are so held, about the heel of the last to apply them adhesively to the lasted parts thereon.

8. The method of applying a rubber upper to a last which comprises presenting its forward portion to the forward portion of the last, swinging one of its heel portions about the heel of the last by engagement with its outer face only and adhesively securing it on said heel of the last, severing the excess stock from said heel portion of the upper, and then likewise swinging, securing and severing excess stock from the other heel portion of the upper.

9. The method of lasting rubber shoes which comprises preparing a last with an adhesive coating and positioning it upon a support, positioning the raw gum upper with relation to said last, and inverted, upon an adjacent support, swinging said upper over onto the last, by engagement with its margins while holding it substantially flat, stretching it against the last, progressively drawing it into contact with the last toward the sole of the latter, and pressing its forward margin against the sole margin of the last to adhesively attach it thereto.

10. A shoe-lasting machine comprising a last support, an upper-supporting member having a position fixed with relation to said last support and adapted to receive an inverted upper in position to be swung over onto a last on said last support, a gauge for positioning said upper on its support, and an upper-transferring mechanism including a toe-stretcher and heel-stretchers constrained to move in determinate courses to so swing said upper and apply it to the last in a position thereon determined by said gauge.

11. A shoe lasting machine comprising a last support, an adjustable last gauge thereon, an upper-supporting member having a position fixed with relation to said last support and adapted to receive an inverted upper in position to be swung over onto a last on said last support, an adjustable gauge for positioning said upper on its support, and an upper-transferring mechanism including a toe-stretcher and heel-stretchers constrained to move in determinate courses to so swing said upper and apply it to the last in a position thereon determined by said gauge, said upper-transferring mechanism being adjustable to vary the course of said toe-stretcher or said heel-stretchers with relation to that of the said toe-stretcher.

12. A shoe-lasting machine comprising a last support, a flexible toe-stretcher positionable adjacent thereto and adapted to receive and adhesively hold the margin of an inverted upper, means for moving said toe-stretcher so as to swing said upper over onto the last, said means and said toe-stretcher being adapted to apply the upper first to the toe portion of the last and then draw it progressively and with substantially uniform tension into contact with the last, and means for changing the shape of said toe-stretcher to conform it substantially to an outline of the last.

13. A shoe-lasting machine comprising means for holding an upper shoe part in a determinate position, means for supporting a last in a determinate position isolated from that of the said part, and means for so moving one of the aforesaid means with relation to the other as to bring said last and said part together in determinate relation, a part of the upper-holding means being adapted to pull the part onto the last by adhesive engagement with only the outer face of a marginal portion thereof.

14. A shoe-lasting machine comprising means for supporting a last with a U-shaped upper applied to the forward part thereof, and members adapted to hold the respective heel portions extended in substantially parallel relation to the sole of the last, said members being mounted for such movement as to twist said heel portions into substantial parallelism with the sides of the heel portion of the last while holding them so extended, and to swing said heel portions successively about the heel of the last.

15. A shoe-lasting machine comprising means for holding a last, and means for pulling an upper shoe part by its margin about said last by non-progressive, adhesive engagement with the outer face only of said margin.

16. A shoe-lasting machine comprising means for bringing an upper shoe part and a last together in determinate relation from determinate, isolated positions, and means for pulling said part by non-progressive engagement with its margin to stretch it over the last and draw said margin inward about the sole of the last.

17. A rubber-shoe uppering machine comprising means for bringing an adhesive, U-shaped upper shoe-part and a last together in determinate relation from determinate, isolated positions, and means engaging the outer face only of said part for swinging its heel margins around the heel portion of the last.

18. A shoe-lasting machine comprising means for supporting a last, a U-shaped toe-stretcher and a pair of heel-stretchers adapted to receive the upper in a substantially flat condition, the heel stretchers being adapted to hold the upper by contact with its outer face only, said stretchers being movable with relation to the last and to each other to present said upper to the last, to pull its toe margin past the sole of the last, and to swing its heel margins about the heel portion of the last.

19. A shoe-lasting machine comprising means for supporting a last, a U-shaped toe stretcher adapted to receive an upper shoe part in a substantially flat condition and hold its margin, by contact with the outer face only of said part and means for effecting such relative movement between said stretcher and said last as to present the upper to the last and stretch it thereover.

20. A shoe-lasting machine comprising means for supporting a last, a U-shaped toe-stretcher and a pair of heel-stretchers adapted to receive the upper in a substantially flat condition and hold its margins, by contact with the outer face only of the upper, and means for effecting such relative movement between said stretchers and said last as to present the upper to the last and stretch it thereover.

21. A shoe-lasting machine comprising means for supporting a last, a U-shaped toe-stretcher and a pair of heel stretchers adapted to receive the upper in a substantially flat condition and hold its margins by contact with their outer face only of the upper, means for effecting such relative movement between the last and said stretchers, as to present the upper to the last and pull it approximately into shoe form about the last, means for closing the toe margin of the upper about the sole-edge of the last, and means for swinging the heel margins successively against the heel of the last and joining them in a heel seam.

22. A shoe-lasting machine comprising a contractile structure adapted to anchor a piece of shoe stock solely by engagement with a marginal portion thereof, means for bringing said structure and a last together in determinate relation from isolated, determinate positions, and means for contracting said structure to close the margin of said piece toward the last.

23. A shoe-lasting machine comprising a U-shaped contractile structure adapted to receive in flat condition and anchor the margin of an upper by contact with the outer face only of said upper, and means for contracting said structure so as to close the margin of said upper toward a last associated therewith.

24. A shoe-lasting machine comprising a U-shaped, flexible member adapted to receive in flat condition and anchor the margin of an upper by contact with the outer face only of said upper, means for flexing the legs of said U-shaped member toward each other so as to close the margin of said upper toward a last associated therewith, and a series of spaced members secured to said U-shaped member and adapted to modify the flexure of its legs to conform them to an outline of the last.

25. A shoe-lasting machine comprising a U-shaped, flexible member adapted by adhesive contact therewith to anchor the margin of an upper shoe part, and means for flexing the legs of said U-shaped member toward each other to pull the upper-margin secured thereto against a last associated therewith.

26. A shoe-lasting machine comprising a contractile structure adapted to anchor an upper shoe part by engagement with only the outer face of the toe margin of said part, means for bringing said structure and a last together in determinate positions, and means for so contracting said structure as to pull said part over the last and draw its margin inward about the sole of the last.

27. A shoe-lasting machine comprising a pair of heel-stretchers adapted in one position to receive the heel portions of an upper and to hold the same substantially in the same plane by engagement with one face only of said heel portions, means for so moving said heel-stretchers as to twist said heel portions in opposite directions into substantially parallel relation with each other, and means for then moving said heel-stretchers, each toward the other, to swing said heel portions about the heel of a last held adjacent them.

28. A shoe-lasting machine comprising a pair of heel-stretchers adapted in one position to receive the heel portions of a U-shaped upper shoe part and to hold the same substantially in the same plane by engagement with their rear margins, means for so moving said heel stretchers as to twist said heel portions in opposite directions into substantially parallel relation with each other, and means for then moving said heel stretchers, each toward the other, to swing said heel portions about the heel of an adjacent last.

29. A shoe-lasting machine comprising means for holding a last and means for pulling a piece of rubber shoe stock about said last, the last-mentioned means comprising a member adapted to hold said stock by engagement with one face only of the latter, said member being formed with a slot adapted to be bridged by the pulled stock in the pulling operation and to give access for the trimming of said stock.

30. A shoe-lasting machine comprising means for holding a last, means for pulling a piece of rubber shoe stock about said last, the last-mentioned means comprising a member adapted to hold said stock by engagement with one face only of the latter, said member having a holding face adapted to anchor the stock and a non-adhesive surface adjacent thereto adapted to press the stock against the last while permitting access to the stock for trimming the latter adjacent said holding face.

31. A shoe-lasting machine comprising means for holding a last, means for pulling a piece of rubber shoe-stock about said last by non-progressive engagement with said piece to secure it adhesively thereon, means for severing excess stock from said piece adjacent said pulling means when it has been so secured, and means for actuating said pulling means and said severing means in determinate relation.

32. A shoe-lasting machine comprising means for holding a last, means for engaging the margin of a piece of rubber stock, means for so moving said engaging means as to pull said piece of stock about said last, means for cutting said stock, along said margin, when it has been so pulled, and means for further moving said stock-engaging means to disengage said margin from the work.

33. A shoe-lasting machine comprising a pair of heel-stretchers adapted to receive and secure the heel portions of an upper approximately in the same plane by engagement with their outer faces only, means for spreading said heel-stretchers apart to admit a last between said heel portions, means for turning said heel-stretchers in opposite directions so as to bring said heel portions approximately into parallel relation with the sides of the last's heel, and means for moving said heel-stretchers laterally of the last to swing said heel portions of the upper about the heel of the last.

34. A shoe-lasting machine comprising means for holding a last, means for presenting the forward portion of the upper and the forward portion of the last to each other, means for swinging the heel portions of the upper about the heel portion of the last by engagement with one face only of the upper to join them in a heel seam, means for severing excess stock from said heel portions, and actuating means for the several aforementioned stock manipulating means adapted to actuate them in determinate relation.

35. A shoe-lasting machine comprising means for holding a last, means for presenting the forward portion of the upper and the forward portion of the last to each other, means for swinging the heel portions of the upper about the heel portion of the last by engagement with one face only of the upper to join them in a heel seam, means for severing excess stock from said heel portions, means for rolling the heel seam, and actuating means for the several aforementioned stock manipulating means adapted to actuate them in determinate relation.

36. A shoe-lasting machine comprising a pair of heel-stretchers and a contractile toe-stretcher adapted to receive an upper and hold the same substantially in a flattened out condition by engagement with one face only of its margins, a last, means for associating said last with the upper so that the latter is stretched from said flattened out condition toward shoe form by contact with the last, means for contracting said toe-stretcher to apply the toe margin of the upper to the last, means for turning said heel-stretchers in opposite directions so as to bring the heel portions of the upper substantially parallel with the last's heel, means for successively moving said heel-stretchers to a medial position at the rear of the last, forward against the last, then laterally beyond said medial position, and then backward and laterally, substantially to their former positions, means for trimming the stock adjacent said heel-stretchers as they are successively presented to the last, and actuating means for the several aforementioned means adapted to actuate them in determinate relation.

37. In a shoe uppering machine, a heel-stretcher and actuating means therefor comprising a pivoted frame, a transverse rack bar mounted on said frame, a stock anchoring member mounted on said rack bar, a pinion journaled on said frame and meshed with said rack bar, and means for driving said pinion to run and retract said stock-anchoring member.

38. In a shoe uppering machine, a heel-stretcher and actuating means therefor comprising a pivoted frame, a slide mounted for radial movement thereon, a rack mounted for transverse movement on said slide, a stock-anchoring member mounted on said rack, a radial shaft mounted on said frame, a pinion splined on said shaft and meshed with said rack, means for turning said shaft, and means for moving said slide on said frame.

39. In a shoe uppering machine, a heel-stretcher and actuating means therefor comprising a pivoted frame, a slide mounted for radial movement thereon, a rack mounted for transverse movement on said slide, a stock-anchoring member mounted on said rack, a radial shaft mounted on said frame, a pinion non-rotatably mounted on said shaft, meshed with said rack and adapted to drive the latter at different radial positions on said frame, and means for turning said shaft.

40. In a shoe uppering machine, a heel-stretcher and actuating means therefor comprising a pivoted frame, a slide mounted for radial movement thereon, a rack mounted for transverse movement on said slide, a stock-anchoring member mounted on said rack, a radial shaft mounted on said frame, a pinion non-rotatably mounted on said shaft, meshed with said rack and adapted to drive the latter at different radial positions on said frame, a spring adapted to turn said shaft in one direction, and cam means acting against said spring to turn it in the opposite direction.

41. In a shoe uppering machine, a heel-stretcher and actuating means therefor comprising an over-swinging frame, and a stock-anchoring member pivotally and slidably mounted on said frame, its pivotal axis being substantially radial with respect to the over-swinging axis of said frame, said stock anchoring member being adapted to be turned on its pivot by the over-swinging movement of said frame.

42. In a shoe uppering machine, a heel-stretcher and actuating means therefor comprising an over-swinging frame, means for stopping said frame in its over-swinging movement, and a stock-anchoring member pivotally mounted on said frame and adapted to be turned upon its pivot by momentum or gravity upon the stopping of said frame by said stopping means.

43. In a shoe uppering machine, a heel-stretcher and actuating means therefor comprising an over-swinging frame, a stock-anchoring member slidably mounted thereon for movement in a radial and in a transverse direction and pivoted on an axis substantially radial with respect to said frame, and means for actuating said stock-anchoring member in its pivotal movement and in its sliding movements in determinate order and amplitude.

44. In a shoe uppering machine, a heel-stretcher and actuating means therefor comprising an over-swinging frame, a stock-anchoring member slidably mounted thereon for movement in a radial and in a transverse direction and pivoted on an axis substantially radial with respect to said frame and also on an axis transverse thereto, stops and springs adapted to regulate its pivotal movements, and means for actuating said stock-anchoring member in its sliding movements in determinate order and amplitude.

45. In a shoe uppering machine, a heel-stretcher and actuating means therefor comprising a rack, a heel-stretcher mounting, a link connecting said rack with said mounting, a guide member slidably associated with said rack and pivoted to said mounting, an over-center spring connecting said mounting with said rack, and a stock-anchoring member on said mounting.

46. In a shoe uppering machine, a heel-stretcher and actuating means therefor comprising a rack, a heel-stretcher mounting, a link connecting said rack with said mounting, a guide member slidably associated with said rack and pivoted to said mounting; an over-center spring connecting said mounting with said rack, a stock-anchoring member pivoted on said mounting on an axis substantially parallel with said rack when said stock-anchoring member is in stock-applying position, means for stopping said stock-anchoring member in movement about said axis, and a spring for yieldingly urging it toward said stop.

47. In a shoe uppering machine, a heel-stretcher and actuating means therefor comprising an over-swinging frame, a slide mounted for radial movement thereon, a heel-stretcher-supporting member mounted for transverse movement on said slide, a stock-anchoring member mounted on said heel-stretcher-supporting member, means for actuating the latter in different positions of said slide, and means for radially moving said slide, the last said means comprising a cam lever acting between said frame and slide, a cam for actuating said lever, and a return spring for said lever.

48. A shoe uppering machine comprising a last support, a contractile toe-stretcher, a pivoted mounting for the latter, a heel-stretcher frame pivoted substantially concentrically with said toe-stretcher mounting, a pair of heel-stretchers on said frame, said toe-stretcher and heel-stretchers being adapted to receive and hold an upper in a substantially flat condition, and said toe-stretcher mounting and heel-stretcher frame being adapted to be turned together about their pivot to present an upper carried thereby to a last mounted on said last support, means for stopping said frame with the heel-stretchers at respective sides of the heel of the last, means for further turning said toe-stretcher mounting to pull the upper toward the sole of the last, and means for contracting said toe-stretcher to pull the margin of the upper against the last.

49. A shoe uppering machine comprising a table, a last support mounted thereon, a carriage movably supported on said table, a toe-stretcher mounting and a heel-stretcher mounting pivoted substantially concentrically on said carriage, said carriage being adapted to be moved toward said last support, concurrently with the swinging of said toe-stretcher support and heel-stretcher support over their pivots toward said last support, and a toe-stretcher and a heel-stretcher mounted on their respective aforementioned supports.

50. A shoe-uppering machine comprising a table, an over-swinging frame thereon, a stock-manipulating device on said over-swinging frame, means for stopping said frame in a determinate position in its over-swinging movement, a cam carrying member slidably mounted on said table, and a cam carried by said member and adapted to actuate said stock-manipulating device when said frame is in its stopped position.

51. A shoe-uppering machine comprising a table, a last support mounted thereon, a rack slidably mounted on said table, a carriage mounted for movement parallel with said rack on said table, a toe-stretcher support and a heel-stretcher support pivoted concentrically on said carriage, a toe-stretcher device and a heel-stretcher device mounted on said supports respectively, said carriage being movable toward said last-support concurrently with the over-swinging of said heel-stretcher support and toe-stretcher support toward said last support, means for stopping said heel-stretcher support in said over-swinging movement, a gear journaled on said carriage and meshed with said rack, means for turning said gear to drive said rack, a cam-carrying frame carried by said rack, and cams on said frame adapted to actuate said heel-stretcher device.

52. A shoe-lasting machine comprising means for supporting a last, means adapted by engagement with a margin of a piece of stock to pull the stock onto the last, and a knife mounted to travel relatively along the surface of the last and to act against the last as a cutting block to cut the stock.

53. A shoe-lasting machine comprising means for supporting a last, means for joining the margins of an upper on the last in a seam, a seam-roller, and means for running the roller on the said seam.

54. A shoe-lasting machine as defined in claim 53 including a seam-trimming device and means for actuating the said device and the seam roller in determinate relation.

55. A rubber-shoe uppering machine comprising means for supporting a last with upper stock thereon, a knife adapted to cut said stock, means for actuating said knife and for returning it to a determinate position between operations, and a heater so positioned as to heat said knife when the latter is in said determinate position.

56. A shoe-lasting machine comprising means for supporting a last with an upper thereon having a height-wise heel seam, a tool adapted to operate along said seam, means for yieldingly holding said tool against the work, and means for running said tool along said seam while said tool is so held.

57. A shoe-lasting machine as defined in claim 56 in which the means for running the tool is adapted to exert upon the tool a component of force directed toward the work.

58. A shoe-lasting machine as defined in claim 56 in which the tool is adapted to be run in one direction out of contact with the work and in the other direction in contact with the work.

59. Apparatus for making rubber footwear, said apparatus comprising means for supporting a last, means for applying an upper to said last, and a pair of instep-pulling members adapted to engage the outer face only of the upper and to be moved inward past the sole-edge of the last to pull the upper onto the instep portions of the last.

60. Apparatus for making rubber footwear, said apparatus comprising means for holding a last, upper-holding means, including a contractile toe-stretcher, adapted to receive a spread upper and hold it by engagement with its margins, means for so moving said last-holding means or said upper-holding means as to pull the upper over the last, a pair of instep pulling members, and means for concurrently contracting said toe-stretcher and moving said instep-pulling members toward each other to pull the upper inward and past the sole edge of the last.

61. Apparatus for building rubber footwear upon a last, said apparatus comprising an upper-holder for supporting an adhesive upper in determinate position and in a flat, spread condition and a last holder adapted to hold a last in determinate position isolated from an upper held by said upper-holder, and means to cause the two holders to move relatively whereby the upper is placed on the last in a position determined by the aforesaid positions of the upper and last on their respective holders and its margin drawn inward about the sole of the last by non-progressive engagement with said margin.

62. In a machine for making footwear of adhesive materials, means for supporting a last, an upper supporting device adapted to support in determinate position an upper of adhesive material, said upper supporting device comprising toe manipulating means and heel manipulating means adapted to tension and apply the toe and heel portions of said adhesive upper to the last, means to cause the said last supporting device and said upper supporting device to move with relation to each other so as to introduce the upper and the last to each other, and means for thereafter actuating said toe manipulating means and said heel manipulating means.

63. A shoe-lasting machine comprising means for holding a last and means engaging marginal portions only of the upper for applying an upper to the entire upper-receiving surface of said last without sliding of the upper on said last.

64. A rubber-shoe lasting machine comprising a toe-stretcher adapted to receive an upper in substantially flat condition and to anchor it by its margins, and means for supporting the middle portion of the upper in substantially flat condition as it is so received, said means and said toe-stretcher being mounted for such relative movement as to permit the stretching of the upper onto a last by said toe-stretcher.

65. The method of applying a rubber shoe part to a last which comprises sticking a portion thereof to the last, swinging the rest of the part about the last to apply it progressively and adhesively thereto up to a trimming line by engagement with an outer marginal face only of the part, and then cutting excess stock from said part along said trimming line.

66. Apparatus for joining two margins of sheet material, the said apparatus comprising a pair of anchoring members each adapted to hold one of the margins, and the two being adapted to receive approximately in the same plane the two margins to be joined, and means for effecting such angular movement of one of said members with relation to the other, about an axis substantially perpendicular to said plane, as to present the said margins in seaming relation to each other.

67. Apparatus for joining two margins of sheet material, the said apparatus comprising a pair of anchoring members each adapted to hold one of the margins by engagement with only one face thereof, and the two being adapted to receive approximately in the same plane the two margins to be joined, and means for effecting such angular movement of one of said members with relation to the other as to present the said margins in seaming relation to each other.

68. Apparatus for joining two margins of sheet material, the said apparatus comprising a pair of anchoring members each adapted to hold one of the margins, and the two being adapted to receive approximately in the same plane the two margins to be joined, means for effecting such angular movement of one of said members with relation to the other, about an axis substantially perpendicular to said plane, as to present the said margins in seaming relation to each other, and means for pressing the said margins together to form a seam.

69. The method of making rubber footwear which comprises mounting a fibrous lining and an overlying rubber shoe part upon a last and cutting the rubber without cutting the fibrous lining by so moving a hot knife over the last that the fibrous lining is employed as a backing member for the cutting operation.

70. Apparatus for making rubber footwear, the said apparatus comprising a last, a cutter, means for heating the cutter, means for yieldingly urging the heated cutter against the work on the last, and means for effecting such movement of the cutter with relation to the last as to effect a cutting of rubber stock mounted upon a curved surface of the last, the dullness of the cutter, the effectiveness of the heating means and the force of the said yielding means being so correlated as to cause the cutter to cut through the rubber without cutting through a fibrous lining underlying the rubber upon the last.

In witness whereof I have hereunto set my hand this 16 day of August, 1922.

FRANK J. MacDONALD.